US012180768B2

(12) United States Patent
Dreyer

(10) Patent No.: US 12,180,768 B2
(45) Date of Patent: Dec. 31, 2024

(54) REVOLVING DOOR ASSEMBLY

(71) Applicant: Assa Abloy Entrance Systems AB, Landskrona (SE)

(72) Inventor: Roger Dreyer, Bjarred (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 25 days.

(21) Appl. No.: 17/801,753

(22) PCT Filed: Mar. 4, 2021

(86) PCT No.: PCT/EP2021/055417
§ 371 (c)(1),
(2) Date: Aug. 23, 2022

(87) PCT Pub. No.: WO2021/175968
PCT Pub. Date: Sep. 10, 2021

(65) Prior Publication Data

US 2023/0082098 A1 Mar. 16, 2023

(30) Foreign Application Priority Data

Mar. 5, 2020 (SE) .................................... 2030067-9

(51) Int. Cl.
*E05F 15/608* (2015.01)
*E06B 3/90* (2006.01)

(52) U.S. Cl.
CPC .............. *E05F 15/608* (2015.01); *E06B 3/90* (2013.01); *E05Y 2201/434* (2013.01);
(Continued)

(58) Field of Classification Search
None
See application file for complete search history.

(56) References Cited

U.S. PATENT DOCUMENTS 1,489,022 A * 4/1924 Sunderland ............... E06B 3/90 49/44
3,766,686 A 10/1973 Sheckells
(Continued)

FOREIGN PATENT DOCUMENTS

DE 9421367 11/1995
DE 19606200 10/1997
(Continued)

OTHER PUBLICATIONS

International Search Report and Written Opinion in PCT/EP2021/055417 mailed Mar. 4, 2021.
Swedish Search Report in 2030067-9 mailed Oct. 15, 2020.

*Primary Examiner* — Marcus Menezes
(74) *Attorney, Agent, or Firm* — Wissing Miller LLP

(57) ABSTRACT

The disclosure relates to a revolving door assembly (1) comprising a central column (2) and at least one door panel connected to the central column (2) and rotatably arranged around a central axis (X) of the central column (2). The revolving door assembly (1) comprises a drive unit (6) enclosed within the central column (2), the drive unit (6) comprising a motor (13) for rotating the door panel (3). According to the revolving door assembly, the motor (13) has a central through hole (H1), wherein one or more cables (C1) of a cable configuration (C) are configured to pass through the central through hole (H1).

11 Claims, 3 Drawing Sheets

(52) U.S. Cl.
CPC ....... *E05Y 2201/71* (2013.01); *E05Y 2400/40* (2013.01); *E05Y 2400/654* (2013.01); *E05Y 2600/41* (2013.01); *E05Y 2800/262* (2013.01); *E05Y 2800/28* (2013.01); *E05Y 2900/132* (2013.01)

(56) References Cited

U.S. PATENT DOCUMENTS

| | | | | |
|---|---|---|---|---|
| 3,887,050 | A * | 6/1975 | Sheckells | E05F 15/608 74/411.5 |
| 6,266,922 | B1 * | 7/2001 | Rockenbach | E05F 15/608 49/42 |
| 8,598,754 | B2 * | 12/2013 | Lacour | H02K 7/116 310/82 |
| 9,243,438 | B2 * | 1/2016 | Busch | E05F 15/608 |
| 9,379,581 | B2 * | 6/2016 | Busch | H02K 11/33 |
| 10,294,709 | B2 * | 5/2019 | Pålsson | E05D 15/02 |
| 2007/0246324 | A1 * | 10/2007 | Lais | E05F 15/614 193/31 A |
| 2008/0244978 | A1 * | 10/2008 | Soyugenc | E05G 5/003 49/42 |
| 2011/0121669 | A1 | 5/2011 | Lacour | |
| 2012/0005961 | A1 * | 1/2012 | Busch | E05F 15/608 49/46 |
| 2012/0313461 | A1 * | 12/2012 | Takeuchi | H02K 7/003 310/43 |
| 2014/0196373 | A1 * | 7/2014 | Busch | E06B 3/90 49/506 |
| 2014/0196374 | A1 * | 7/2014 | Busch | E05F 15/60 49/46 |
| 2014/0196375 | A1 * | 7/2014 | Busch | E05F 15/40 49/46 |
| 2014/0197711 | A1 * | 7/2014 | Busch | H02K 11/33 310/254.1 |
| 2014/0197717 | A1 * | 7/2014 | Busch | H02K 1/14 310/156.01 |
| 2019/0128533 | A1 * | 5/2019 | Bunzel | H02G 11/00 |

FOREIGN PATENT DOCUMENTS

| | | | |
|---|---|---|---|
| DE | 19711460 | 11/1997 | |
| DE | 202008005104 | 6/2008 | |
| DE | 102013000422 | 7/2014 | |
| DK | 3129574 | 4/2019 | |
| EP | 340771 | 5/1989 | |
| EP | 2071112 | 6/2009 | |
| EP | 2313960 | 4/2011 | |
| EP | 2754826 | 7/2014 | |
| EP | 2755305 | 7/2014 | |
| WO | 9208868 | 5/1992 | |
| WO | 2015155013 | 10/2015 | |
| WO | WO-2015155014 A1 * | 10/2015 | E05D 15/02 |
| WO | 2018082166 | 5/2018 | |

* cited by examiner

REVOLVING DOOR ASSEMBLY

This application is a 371 of PCT/EP2021/055417, filed on Mar. 4, 2021, published on Sep. 10, 2021 under publication number WO 2021/175968, which claims priority benefits from Swedish Patent Application No. 2030067-9, filed on Mar. 5, 2020, the disclosure of which is incorporated herein by reference.

TECHNICAL FIELD

The present invention relates to a revolving door assembly comprising a central column and at least one door panel connected to the central column and rotatably arranged around a central axis.

BACKGROUND ART

Revolving doors are manufactured in different sizes. The size of a revolving door may be dependent on the number of people that are expected to walk through the revolving door and the desired size to visually fit the building and/or to achieve a particular image. The size of a revolving door may also be dependent on the size of an existing revolving door to be replaced or the opening in a building or inner wall in which the revolving door is installed. In order to meet the required size each revolving door is manufactured based on the desired size in a customized fashion.

Revolving doors are in many installations automatically controlled and therefore have a drive unit including a motor and usually a gear.

The drive unit may be installed above the door panels of the revolving door such as in DE 196 06 200 A1, EP 340 771 A1. However, the location of the drive unit above the door panels results in an increased height of the revolving door and cover sheets or panels above the door panels are required to conceal the drive unit which may disturb the aesthetic appearance, in particular when the revolving door is installed in a building having a glass facade.

The drive unit may also be located in a pit in the floor as in DE 94 21 367 U1. However, this requires extensive modification and rebuilding of the floor and may not be possible e.g. if there is a storey, such as a basement, below the installation site of the revolving door.

The drive unit may also be located in a central body of the revolving door as in WO 92/08868 A1, DE 94 21 367 U1 (see e.g. FIG. 1) and DE 197 11 460 A1. However, the location in a central body results in a bulky construction that requires a large central body and thus a large revolving door with a large installation width is required or if the total width of the revolving door is limited the passage capacity is decreased. The large and bulky central body may also disturb the aesthetic appearance of the revolving door.

All the above described revolving doors according to prior art also requires extensive installation as well as comprehensive customization of the revolving door.

EP 3 129 574 B1 discloses a revolving door assembly with a central column comprising a motor and a gear, where the gear has a rod through hole, wherein a support rod passes through the rod through hole and supports the motor. The motor is displaced such that space for accommodating a through channel is available next to the motor.

However, there exists a need for a further improved revolving door.

OBJECTS OF THE INVENTION

One object of the present invention is to achieve a revolving door having a compact design. One object of the present invention is to obtain a flexible and optional power connection of a revolving door. One object of the present invention is to provide a plurality of options for power connection of a revolving door. One object of the present invention is to facilitate installation of a revolving door. One object of the present invention is to achieve an aesthetically appealing appearance of a revolving door.

SUMMARY OF THE INVENTION

These and further objects are achieved by a revolving door assembly comprising a central column and at least one door panel connected to the central column and rotatably arranged around a central axis, as set out in the appended independent claim. Preferred embodiments of the revolving door assembly are defined in appended dependent claims.

According to an aspect the objects are achieved by revolving door assembly comprising a central column and at least one door panel connected to the central column and rotatably arranged around a central axis of the central column, wherein the revolving door assembly comprises a drive unit enclosed within the central column, the drive unit comprising a motor for rotating the door panel, characterized in that the motor has a central through hole, wherein one or more cables of a cable configuration are configured to pass through the central through hole.

Hereby a compact revolving door having a compact design is facilitated in that the central column may be made with a smaller diameter. By thus arranging a motor having a central through hole within the central column and having one or more cables allowed through the central through hole a flexible and optional power connection of the revolving door is facilitated. Hereby a plurality of options for power connection of the revolving door is provided. By thus utilizing such a motor having a central through hole, installation of the revolving door is facilitated in that less components are required. By thus utilizing such a motor having a central through hole for a new application, a reliable solution of the revolving door assembly may be obtained. By thus utilizing such a motor having a central through hole for a new application, an aesthetically appealing appearance of a revolving door is facilitated. By thus arranging such a motor having a central through hole within the central column and having cables that are configured to pass the motor within the central column passing through the central through hole, instead of having a conventional motor displaced in the central column for allowing cable to pass on the side of the motor, a relatively smaller diameter of the central column with remaining power of the motor is facilitated in that the motor may be coaxially arranged within the central column and thus have a diameter essentially corresponding to the inner diameter of the central column. By thus arranging such a motor having a central through hole within the central column and having cables that are configured to pass the motor within the central column passing through the central through hole, instead of having a conventional motor displaced in the central column for allowing cable to pass on the side of the motor, a motor with higher power with the same diameter of the central column may be provided, in that the motor may be coaxially arranged within the central column and thus have a diameter essentially corresponding to the inner diameter of the central column. A motor with higher power may facilitate reducing the sound/noise provided by the motor, when run at the same required power for operating the one or more doors or the revolving door assembly. By thus arranging such a motor having a central through hole, e.g. a hollow shaft torque motor, within the central column, the need for gear ratio is reduced since such a motor is designed to run at lower speed. The one or more cables of a cable configuration configured to pass through the central through hole may comprise any suitable cable/cables for facilitating operation of the revolving door assembly.

According to an aspect of the revolving door assembly, the motor has an outer diameter essentially corresponding to an inner diameter of the central column. Hereby a compact a revolving door having a compact design is facilitated in that the diameter of the central column may essentially correspond to the diameter of the motor. By thus arranging such a motor having a central through hole within the central column a relatively small diameter of the central column is facilitated at the same time as a high torque centre shaft may be provided. By thus arranging such a motor having a central through hole within the central column and having cables that are configured to pass the motor within the central column pass through the central through hole a relatively smaller diameter of the central column with remaining power of the motor is facilitated.

According to an aspect of the revolving door assembly, the motor is configured to be arranged within the central column so that the central through hole of the motor is coaxially arranged relative to the central axis of the central column. Hereby a compact a revolving door having a compact design is facilitated in that the diameter of the central column may essentially correspond to the diameter of the motor. By thus arranging such a motor having a central through hole within the central column a relatively small diameter of the central column is facilitated at the same time as a high torque centre shaft may be provided.

According to an aspect of the revolving door assembly, the central column has an upper side and a lower side, wherein the central column is provided with a passage from the upper side to the lower side via the central through hole of the motor for allowing introduction of cables of the cable configuration from either side of the central column. According to an aspect of the revolving door assembly, the central column is provided with a passage from outside the upper side, through the upper side to and through the lower side via the central through hole of the motor for allowing introduction of cables of the cable configuration from either side of the central column. Hereby a flexible and optional power connection of the revolving door is facilitated. Hereby a plurality of options for power connection of the revolving door is facilitated. Hereby power supply for supplying the motor may be provided from the upper side or from the lower side, thus facilitating power provision for powering the motor.

According to an aspect of the revolving door assembly, the motor is a hollow shaft torque motor.

According to an aspect of the revolving door assembly, the motor is a brush motor.

According to an aspect of the revolving door assembly, the drive unit comprises a gear operably connected to the motor, wherein the gear has a through hole through which one or more cables of the cable configuration are allowed to pass. Hereby operation of the one or more doors of the revolving door assembly is facilitated at the same time as a compact revolving door having a compact design is facilitated in that the central column may be made with a smaller diameter.

According to an aspect of the revolving door assembly, the motor and the gear are arranged within the central column such that one is located above the other, wherein the through hole of the gear is arranged so as to facilitate passage of cables of the cable configuration through both the through hole of the gear and the central through hole of the motor. Hereby a flexible and optional power connection of the revolving door is facilitated. Hereby a plurality of options for power connection of the revolving door is facilitated.

According to an aspect of the revolving door assembly, the passage of the central column is configured to run via the through hole of the gear. Hereby a flexible and optional power connection of the revolving door is facilitated. Hereby a plurality of options for power connection of the revolving door is facilitated.

According to an aspect of the revolving door assembly, the cable configuration comprises cable for powering the motor.

According to an aspect of the revolving door assembly, the cable configuration comprises a tube for accommodating cables of the cable configuration, wherein said tube is configured to run through the central through hole of the motor. Hereby assembly of the revolving door assembly is facilitated. Hereby operation of the revolving door assembly may be controlled in an efficient way by having a tube through which cable are configured to pass for connection to units associated with operation of the revolving door assembly.

According to an aspect the revolving door assembly further comprises one or more control units arranged above the drive unit and/or one or more control units arranged below the drive unit, said one or more control units being configured to facilitate operation of the revolving door assembly, said one or more control units being operably connected to one or more cables of the cable configuration. Hereby a flexible and optional power connection of the revolving door is provided. Hereby a plurality of options for power connection of the revolving door is provided. Hereby efficient operation of the revolving door assembly may be provided in a compact way where space within and in connection to the central column may be efficiently utilized.

Further objects and features of the present disclosure will appear from the following detailed description of embodiments of the invention.

BRIEF DESCRIPTION OF THE DRAWINGS

The invention will be described in more detail with reference to the accompanying drawings, in which.

DETAILED DESCRIPTION

Figure 1:
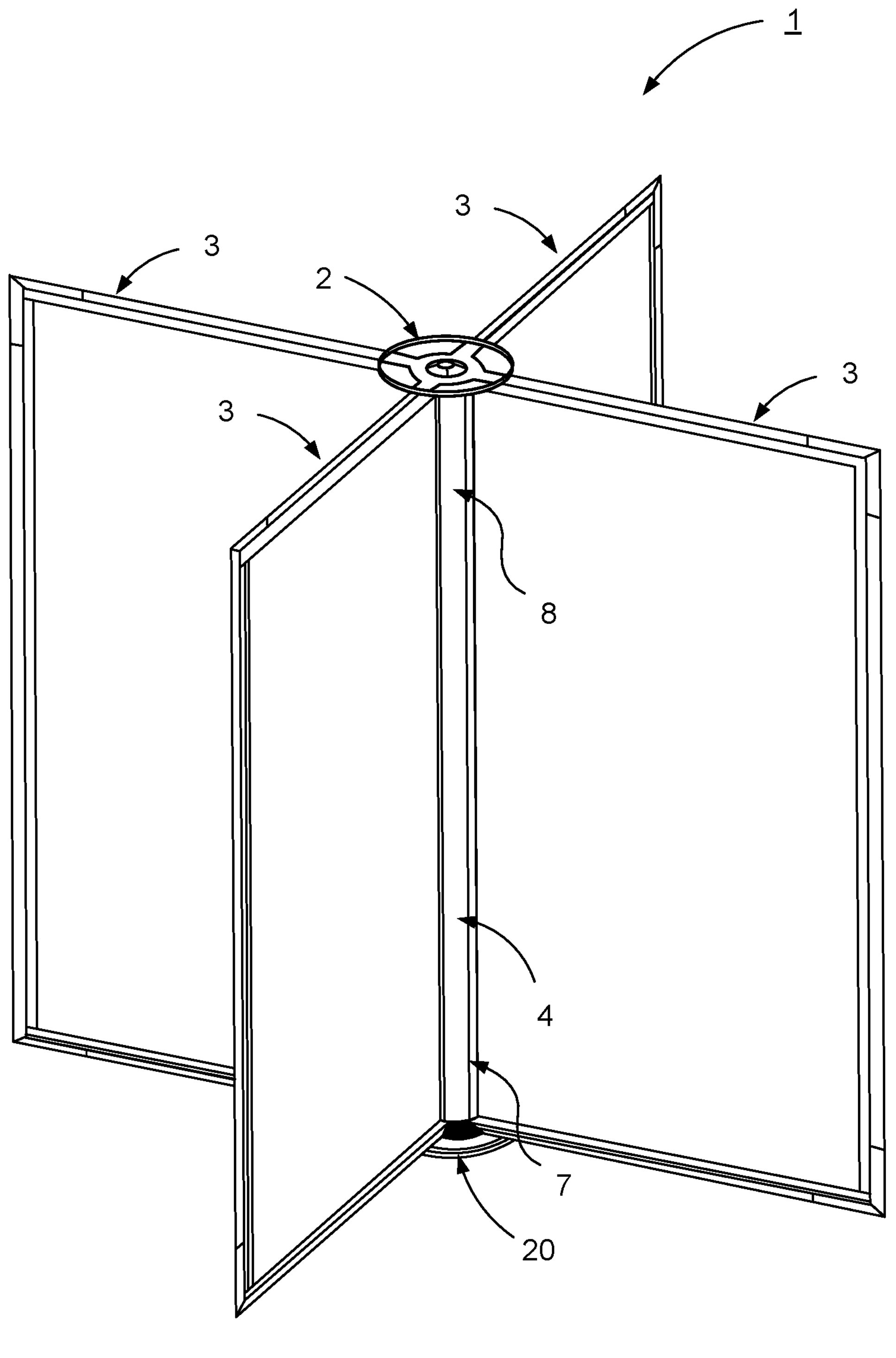
FIG. 1 schematically illustrates a perspective view of a revolving door assembly according to an aspect of the present disclosure.
Figure 2:
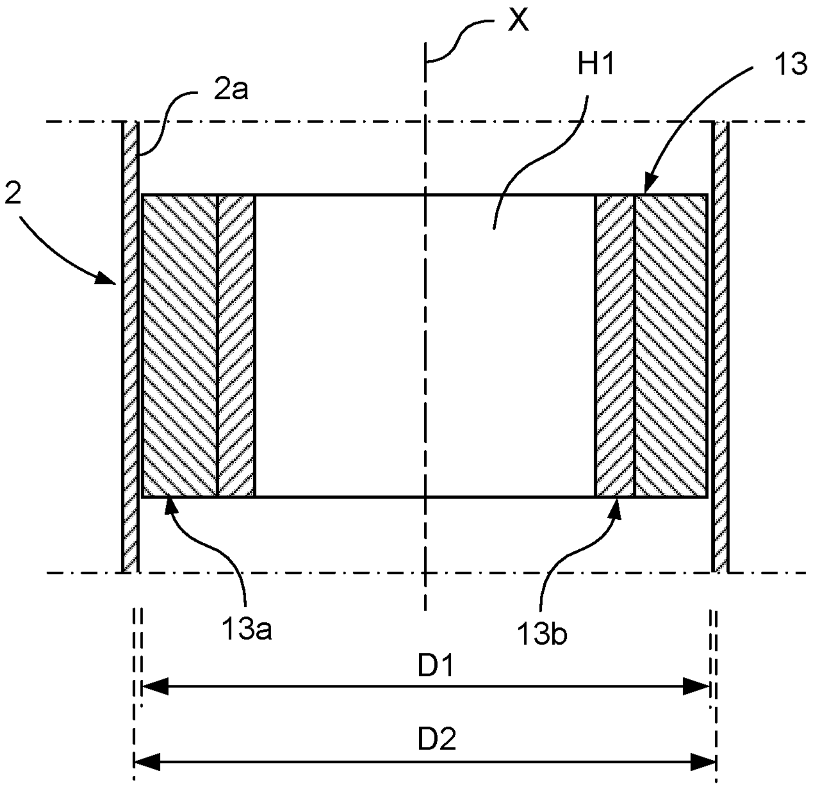
FIG. 2 schematically illustrates a cross sectional view of a portion of a revolving door assembly with a drive unit according to an aspect of the present disclosure; and, FIG. 3 schematically illustrates a front view of a portion of a revolving door assembly with driving base unit according to an aspect of the present disclosure.
Figure 3:
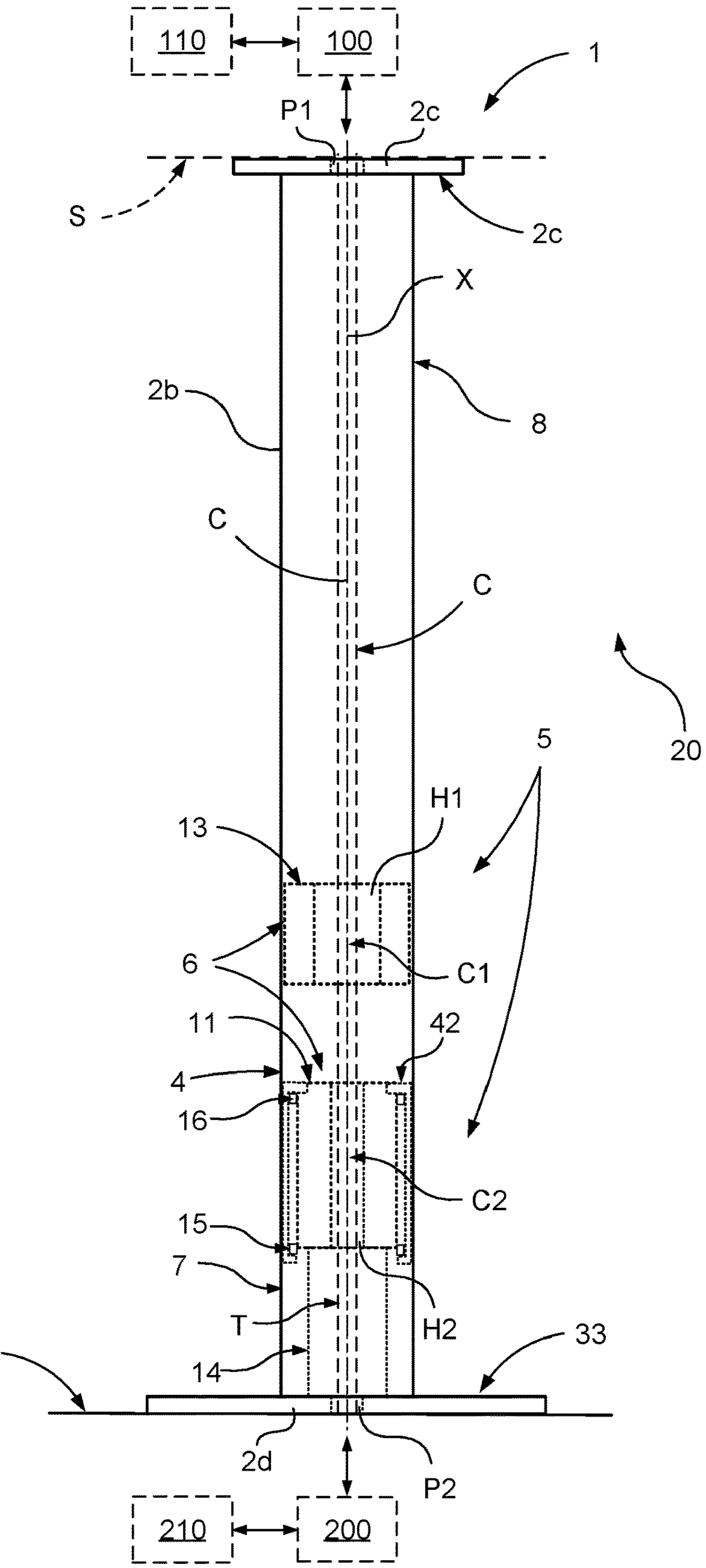

A revolving door assembly 1 comprising a central column 2 and at least one door panel 3 connected to the central column 2 and rotatably arranged around a central axis X is shown in FIG. 1 and details thereof are shown in FIGS. 2-3. The central column 2 is configured to be essentially vertically arranged.

The central column 2 comprises a driven column 4 and a driving base unit 5. The driving base unit 5 is arranged to drive the driven column 4 to rotate the driven column 4 and the door panels 3 connected to the driven column 4 around said central axis X. The driven column 4 is thereby driven by the driving base unit 5 and the driving base unit 5 drives the driven column 4. Thereby, the driving base unit 5 is an active part in the rotation of the driven column 4 and the driven column 4 is a passive part in the rotation of the driven column 4.

The driving base unit 5 comprises a drive unit 6. The drive unit 6 comprises a motor 13. The motor 13 is arranged to rotate the door panels 3 connected to the central column 2 around said central axis X. The motor 13 is arranged to rotate the driven column 4 and the door panels 3 connected to the driven column 4 of the central column 2 around said central axis X. The driven column 4 is connected to the drive unit 6. The driven column 4 is driven by the drive unit 6.

The central column 2 is according to an aspect arranged centered in relation to the centre axis X of the revolving door assembly 1. That is, the centre of the central column 2 coincides with the centre axis X. The driven column 4 is according to an aspect arranged centered in relation to the centre axis X of the revolving door assembly 1. That is, the centre of the driven column 4 coincides with the centre axis X. The driving base unit 5 is arranged centered in relation to the centre axis X of the revolving door 1. That is, the centre of the driving base unit 5 coincides with the centre axis X.

As illustrated in FIGS. 2 and 3, the motor 13 has a central through hole H1. According to an aspect of the present disclosure, the motor 13 is a hollow shaft torque motor. According to an aspect of the present disclosure, the motor may alternatively be a brush motor.

According to an aspect of the present disclosure, the motor 13 has a hollow cylindrical configuration. According to an aspect of the present disclosure, the motor 13 has an outer stator portion 13*a*, and inner rotor portion 13*b* and said central through hole H1.

According to an aspect of the present disclosure, as illustrated in FIG. 2, the motor has an outer diameter D1 essentially corresponding to an inner diameter D2 of the central column 2. The central column 2 may thus have a hollow configuration. The central column 2 may thus have at least one or more portions having a hollow cylindrical configuration. The central column 2 may thus have a portion with an inner side 2*a* with an inner diameter D2 essentially corresponding to the outer diameter D2 of the motor. The central column 2 has may have an outer side 2*b*.

According to an aspect of the present disclosure, as illustrated in FIGS. 2 and 3, the motor 13 is configured to be arranged within the central column 2 so that the central through hole H1 of the motor 13 is coaxially arranged relative to the central axis X of the central column 2.

The motor 13 is thus arranged centered in relation to the centre axis X of the revolving door assembly 1. That is, the centre of motor 13, i.e. centre of the central through hole H1 of the motor 13, coincides with the centre axis X.

According to an aspect of the present disclosure, the motor 13 has an essentially hollow cylindrical configuration.

As illustrated in FIG. 3, one or more cables C1 of a cable configuration C for facilitating operation of the revolving door assembly 1 are configured to pass through the central through hole H1.

According to an aspect of the present disclosure, the central column 2 has an upper side 2*c* and a lower side 2*d*.

According to an aspect of the present disclosure, the central column 2 is provided with a passage P from the upper side 2*c* to the lower side 2*d* via the central through hole H1 of the motor 13 for allowing introduction of cables of the cable configuration C from either side of the central column 2. According to an aspect of the present disclosure, the central column is provided with said passage from outside the upper side 2*c*, through the upper side 2*c* to and through the lower side 2*d* via the central through hole H1 of the motor 13 for allowing introduction of cables of the cable configuration C from either side of the central column 2. The central column 2 may thus have an upper passage P1 arranged at the upper side 2*c*. The central column 2 may thus have a lower passage P2 arranged at the lower side 2*d*. Hereby e.g. power cable for powering the motor 13 may be provided from the upper side 2*c* or the lower side 2*d* depending on situation.

As mentioned below, the revolving door assembly 1, i.e. the central column 2 of the revolving door assembly 1 may be freestanding so that the central column is only connected to the floor/ground and the upper side of the central column 2 is not connected to a sealing. The revolving door assembly 1, i.e. the central column 2 of the revolving door assembly 1 may alternatively also be connected to a sealing S.

According to an aspect of the present disclosure, the drive unit 6 comprises a gear 11 operably connected to the motor 13. According to an aspect of the present disclosure, the gear 11 has a through hole H2 through which one or more cables of the cable configuration C are allowed to pass.

According to an aspect of the present disclosure, the motor 13 and the gear 11 are arranged within the central column 2 such that one is located above the other, wherein the through hole H2 of the gear is arranged so as to facilitate passage of cables C2 of the cable configuration C through both the through hole H2 of the gear 11 and the central through hole H1 of the motor.

According to an aspect of the present disclosure, the passage P of the central column 2 is configured to run via the through hole H2 of the gear 11.

According to an aspect of the present disclosure, the central column 2 is provided with said passage from outside the upper side 2*c*, through the upper side 2*c* to and through the lower side 2*d* via the central through hole H1 of the motor 13 and via the through hole H2 of the gear 11 for allowing introduction of cables of the cable configuration C from either side of the central column 2.

According to an aspect of the present disclosure, cables of the cable configuration C configured to pass through the central through hole H1 of the motor 13 and the through hole H2 of the gear may be cables for sensors, e.g. sensors mounted on the door panels 3.

According to an aspect of the present disclosure, the cable configuration C comprises cable for powering the motor 13.

According to an aspect of the present disclosure, the cable configuration C comprises a tube T for accommodating cables of the cable configuration C. Said tube T is configured to run through the central through hole H1 of the motor. Said tube T may further be configured to run through the through hole H2 of the gear 11.

According to an aspect of the present disclosure, the revolving door assembly 1 further comprises one or more control units 100 arranged above the drive unit 6 and/or one or more control units 200 arranged below the drive unit 6. Said one or more control units 100, 200 may be configured to facilitate operation of the revolving door assembly 1. Said one or more control units 100, 200 may be operably connected to one or more cables of the cable configuration C. Said one or more control units 100, 200 may be arranged to automatically control the rotation of the revolving door assembly 1.

Said one or more control units 100, 200 may be arranged within the central column 2 and/or externally to the central column 2.

A revolving door assembly 1 comprising one or more control units 100 arranged above the drive unit 6 may have one or more control units 100 be arranged within the central column 2 and/or above the upper side 2*c* of the central column 2.

A revolving door assembly 1 comprising one or more control units 200 arranged below the drive unit 6 may have one or more control units 100 be arranged within the central column 2 and/or below the lower side 2*d* of the central column 2.

One or more of said one or more control units 100, 200 may be comprised in the drive unit 6. Hereby the drive unit 6 may comprise one or more control units 100 arranged above the motor 13 and gear 11, wherein one or more control units 100 may be arranged within the central column 2 and/or above the upper side 2*c* of the central column 2. Hereby the drive unit 6 may comprise one or more control units 100 arranged below the motor 13 and gear 11, wherein one or more control units 100 may be arranged within the central column 2 and/or below the lower side 2*d* of the central column 2.

The one or more control units 100, 200 may be implemented as a separate entity or distributed in two or more physical entities. The one or more control units 100, 200 may comprise one or more computers. The one or more control units 100, 200 may thus be implemented or realised by a control unit comprising a processor and a memory, the memory comprising instructions, which when executed by the processor causes the control unit to perform the herein disclosed method.

The one or more control units 100, 200 may be operably connected to one or more sensors 110, 210 arranged in connection to the revolving door assembly 1 and configured to facilitate operation of the revolving door assembly. The revolving door assembly 1 may comprise such one or more sensors 110, 210. Such sensors may be associated with detecting persons intended to pass through the one or more doors of the revolving door assembly so that the one or more control units may activate a revolving operation of the one or more doors of the revolving door assembly so as to allow passage there through. Such sensors may be associated with safety of the revolving door assembly and may be configured to detect safety issues e.g. requiring deactivation of the revolving door assembly.

The driving base unit 5 may be arranged within the driven column 4. By arranging the driving base unit comprising the drive unit within the driven column, achievement of a compact and aesthetically appealing design is facilitated, since the driving base unit is covered by the driven column.

The driven column 4 may according to an aspect of the present disclosure be supported by the driving base unit 5. Thus, the weight of the driven column 4 may be carried by the driving base unit 5. The driven column 4 may be mounted to the driving base unit 5.

The driven column 4 may extend above the driving base unit 5. Thus, the top of the driven column 4 may be located above the top of the driving base unit 5. The driven column 4 may extend above the top of the driving base unit. With the driven column 4 extending above the driving base unit 5, the driving base unit 5 is not located within the upper portion of the driven column 4. Thus, the upper portion of the driven column 4 does in this case not encompass the driving base unit 5 or the drive unit 6 of the driving base unit 5. The driven column 4 may extend above driving base unit 5 from the bottom of the opening. Thereby, the driven column is easily adaptable to the installation, e.g. by cutting.

The revolving door assembly 1 has at least one door panel 3. The revolving door assembly 1 may comprise two, three, four, five, six or more door panels 3. Revolving doors having two to four door panels are the most common configurations. The revolving door assembly 1 shown in FIG. 1 has four door panels 3.

The revolving door assembly 1 may be for installation in an opening. The opening can be an opening in a building wall, such as a facade or outer wall or an interior wall. The opening can be limited by a right and a left restriction, such as a right and a left doorjamb. The opening can also be limited by a bottom restriction, such as a floor or ground. The opening may also be limited by a top restriction, such as a ceiling or top door jamb. The opening may also be without top restriction, i.e. with an open top, which may be the case for example when the opening is arranged in an indoor partition dividing a room in smaller areas or when the opening is arranged in a fence. The revolving door assembly of the present invention may be arranged in an opening with an open top since it may be arranged as a freestanding revolving door.

The height of the driven column 4 may be adaptable so as to facilitate providing a driving base unit 5 having a standard configuration that is equal for all or at least several revolving doors. The driving base unit 5 may have a fixed standard height. Then the height of the driven column 4 is customized to fit the installation, such as the height of the opening. All driving and controlling equipment performing the rotation of the revolving door assembly 1 may be included in the driving base unit 5. The driven column 4 can simply be cut by sawing or machining. The driven column 4 may be a tube, which may be made of metal, such as aluminum, or any other suitable material.

The height of the driven column 4 may be adaptable such that the height of the central column 2 is essentially equal to or larger than the height of the door panel 3. The height of the driven column 4 may be adaptable such that the height of the central column 2 is essentially equal to the height of the door panel 3. In one aspect, the height of the driven column 4 is adjustable. The height of the driven column 4 may be adjustable by means of a telescoping portion.

The revolving door assembly may have a modular structure, which comprises three main modules, namely the driving base unit 5, the driven column 4 and said at least one door panel 3. The driving base unit 5 is may be a standard module that is the same for all or at least a large number of revolving doors 1 having different sizes.

The revolving door assembly 1 may be an automatic revolving door assembly 1. The automatic revolving door assembly 1 may be automated by means of the drive unit 6.

It is possible to only attach the revolving door assembly to the floor at the centre of the revolving door assembly 1 further facilitating arrangement of the revolving door assembly as a freestanding door and further facilitating the installation of the revolving door assembly.

The revolving door assembly may be mounted in any suitable way. According to an aspect of the present disclosure, the revolving door assembly 1 may be freestanding. This implies that the revolving door assembly 1 can stand by its own. It is sufficient to mount the driving base unit 5 to the floor or any other suitable foundation, e.g. by mounting a support structure 14 to the floor or foundation. According to an aspect of the present disclosure, the driving base unit 5 may be freestanding.

The revolving door assembly may comprise bearings for guiding and stabilizing the revolving door assembly arranged in any suitable way in connection to the central column. According to an aspect of the present disclosure, the revolving door assembly 1. In FIG. 3 bearings 15, 16 are arranged in the lower part in connection to the central column 2. Bearings 15, 16 may be comprised in the in the driving base unit 5 of the central column 2 and may be mounted to the support structure 14.

The driven column 4 may comprise a bottom column part 7 connected to the driving base unit 5 and a top column part 8 connected to the bottom column part 7. The height of the top column part 8 may be adaptable. By dividing the driven column 4 in two parts, a bottom column part 7 and a top column part 8, the bottom column part 8 can be pre-fitted to the driving base unit 5 e.g. at the manufacturer before shipping.

The gear 11 is arranged to rotate the door panels 3 connected to the central column 2 around said central axis. The gear 11 is arranged to rotate the driven column 4 and the door panels 3 connected to the driven column 4 around said central axis X. The gear 11 is arranged to rotate the door panels 3 by means of the motor 13. The gear 11 is arranged to transmit a rotating movement of the motor 13 to a rotating movement of the door panel 3. The gear 11 may be a gear box comprising a plurality of gearwheels.

The gear 11 may be an oscillating gear 11. As used herein oscillating means a repetitive non-rotating movement about an axis. The oscillating gear 11 is arranged to transform a rotating movement from the motor 13 into an oscillating movement in the gear 11 and back to a rotating movement of the door panel 3. An input member, not shown, of the gear may be rotated by the motor 13. An output member, not shown, of the gear 11 may be configured to rotate the door panel. The output member may be connected to the door panel 3 such that the door panel 3 rotates. The output member may be connected to the driven column 4 such that the driven column 4 rotates. The door panel 3 is connected to the driven column 4 and thereby the door panel 3 rotates when the driven column 4 rotates. An oscillating part, not shown, may be arranged between the input member and the output member of the bear 11.

According to an aspect of the present disclosure, the gear 11 is arranged centered in relation to the centre axis X of the revolving door assembly 1. That is, the centre of the gear 11 may coincide with the centre axis X.

According to an aspect of the present disclosure, the central column 2 comprises a support structure 14. According to an aspect of the present disclosure, the driving base unit 5 of the central column 2 comprises the support structure 14.

The motor 13 may be mounted in any suitable way within the central column 2. According to an aspect of the present disclosure, the motor 13 may be mounted to the support structure 14. The drive unit 6 including the motor 13 may be mounted to the support structure 14. The gear 11 may be mounted to the support structure 14. The drive unit 6 including the motor 13 and the gear 11 may be mounted to the support structure 14.

According to an aspect of the present disclosure, the comprises a bottom support 14*a*. According to an aspect of the present disclosure, the support structure 14 may be arranged to be mounted at the bottom of the opening. The support structure 14 may be arranged to be mounted to the floor F in the opening. The revolving door assembly 1 may be arranged to be supported by the support structure 14.

According to an aspect of the present disclosure, an output shaft of the motor 13 may be connected to an inner portion of the gear 11, and an outer portion of the gear 11 may be connected to the rotating portion of the central column 2, i.e. the driven column 4.

According to an aspect of the present disclosure, a control system, e.g. comprising one or more control units, may be arranged furthers down, followed by the motor. The outer portion of the motor may be connected to motor power and be non-rotating.

According to an aspect of the present disclosure, with the electric power provided from above, e.g. from the roof, a control system, e.g. comprising one or more control units, may be arranged above motor and gear, wherein motor power and control signals from sensors, may be configured to be led through the central through hole of the motor and the through hole of the gear by means of cables of the cable configuration.

Above, e.g. with reference to FIG. 3, a revolving door assembly 1 with a central column 2 comprising a drive unit 6 with both a motor 13 and gear 11. According to an aspect of the present disclosure a revolving door assembly may be configured without gear and thus with only a central column enclosed motor, e.g. hollow shaft torque motor, for providing rotation of the one or more door panels. Thus, in such a case the drive unit comprises motor drive unit enclosed within the central column, where the drive unit comprises a motor for rotating the door panel, but no gear.

The foregoing has described the principles, preferred embodiments and aspects and modes of operation of the present invention. However, the description should be regarded as illustrative rather than restrictive, and the invention should not be limited to the particular embodiments and aspects discussed above. The different features of the various embodiments and aspects of the invention can be combined in other combinations than those explicitly described. It should therefore be appreciated that variations may be made in those embodiments and aspects by those skilled in the art without departing from the scope of the present invention as defined by the following claims.

The invention claimed is:

1. A revolving door assembly comprising a central column and at least one door panel connected to the central column and rotatably arranged around a central axis of the central column, wherein the revolving door assembly further comprises a drive unit enclosed within the central column, the drive unit comprising a motor for rotating the door panel, wherein the motor has a central through hole, wherein one or more cables of a cable configuration are configured to pass through the central through hole, wherein the drive unit comprises a gear operably connected to the motor, wherein the gear has a through hole forming a passage through which one or more cables of the cable configuration are allowed to pass.

2. The revolving door assembly according to claim 1, wherein the motor has an outer diameter essentially corresponding to an inner diameter of the central column.

3. The revolving door assembly according to claim 1, wherein the motor is configured to be arranged within the central column so that the central through hole of the motor is coaxially arranged relative to the central axis of the central column.

4. The revolving door assembly according to claim 1, wherein the central column has an upper side and a lower side, wherein the central column is provided with a passage from the upper side to the lower side via the central through hole of the motor for allowing introduction of cables of the cable configuration from either side of the central column.

5. The revolving door assembly according to claim 1, wherein the motor is a hollow shaft torque motor.

6. The revolving door assembly according to claim 1, wherein the motor is a brush motor.

7. The revolving door assembly according to claim 1, wherein the motor and the gear are arranged within the central column such that one is located above the other, wherein the through hole of the gear is arranged to form a passage for the cables of the cable configuration through both the through hole of the gear and the central through hole of the motor.

8. The revolving door assembly according to claim 1, wherein the passage of the central column is configured to run via the through hole of the gear.

9. The revolving door assembly according to claim 1, wherein the cable configuration comprises a cable for powering the motor.

10. The revolving door assembly according to claim 1, wherein the cable configuration comprises a tube for accommodating cables of the cable configuration, wherein said tube is configured to run through the central through hole of the motor.

11. The revolving door assembly according to claim 1, further comprising one or more control units, wherein at least one of the one or more control units is arranged above the drive unit or below the drive unit, said one or more control units being configured to facilitate operation of the revolving door assembly, said one or more control units being operably connected to one or more cables of the cable configuration.

* * * * *